United States Patent
Widdowson et al.

(10) Patent No.: US 6,949,733 B2
(45) Date of Patent: Sep. 27, 2005

(54) DETERMINATION OF A MOVABLE GANTRY POSITION INCLUDING A DUAL MEASUREMENT MODULE

(75) Inventors: Gary Peter Widdowson, Hong Kong (CN); Sun Kuen Wong, Hong Kong (CN); Ajit Gaunekar, Singapore (SG)

(73) Assignee: ASM Technology Singapore Pte Ltd (SG)

( * ) Notice: Subject to any disclaimer, the term of this patent is extended or adjusted under 35 U.S.C. 154(b) by 332 days.

(21) Appl. No.: 10/387,210

(22) Filed: Mar. 10, 2003

(65) Prior Publication Data

US 2004/0178327 A1 Sep. 16, 2004

(51) Int. Cl.$^7$ .................................................. H01J 40/14
(52) U.S. Cl. .................................... 250/221; 250/559.29
(58) Field of Search ............................ 250/221, 559.29, 250/559.33, 237 G, 363.02, 363.05, 370.1

(56) References Cited

U.S. PATENT DOCUMENTS 5,093,575 A * 3/1992 Perusek .................. 250/363.08

* cited by examiner

Primary Examiner—Que T. Le
(74) Attorney, Agent, or Firm—Ostronlenk, Faber, Gerb & Soffen, LLP

(57) ABSTRACT

The position of a working point relative to a working space, such as a working point of a carriage on a gantry beam of an XY positioning table, is determined by measuring at least two sets of displacements. A first set of displacements, of the working point relative to an intermediate component, such as the gantry beam, includes a relatively large displacement (X) in a first linear degree of freedom and relatively small displacements ($Y_1'$, $Y_2'$), in at least two of the five degrees of freedom other than the first. The second set of displacements, of the intermediate component relative to the working space, includes a relatively large displacement ($Y_1$, $Y_2$), in a second linear degree of freedom, and relatively small displacements ($X_1'$, $X_2'$), in at least two of the five degrees of freedom other than the second.

27 Claims, 4 Drawing Sheets

DETERMINATION OF A MOVABLE GANTRY POSITION INCLUDING A DUAL MEASUREMENT MODULE

FIELD OF INVENTION

The invention relates to movable gantry systems and in particular to the accurate determination of the position of a device carried on such a gantry system. The device position may be in a two dimensional plane or a three dimensional space.

BACKGROUND

The invention has application to high accuracy gantry positioning systems having substantially perpendicular, serially stacked, motion stages. Such systems have application in die placement machines, wafer inspection machines and co-ordinate measuring machines, and to accurate positioning systems requiring free access to a substantially stationary working area.

References herein to gantry systems are to be understood as including multi-axis positioning systems whereby a device is required to be accurately positioned in a two dimensional plane or a three dimensional space. In a typical two dimensional arrangement, the device is supported by a carriage which is movable back and forth in a first direction along a gantry beam. The gantry beam is movable back and forth in a second direction which is typically perpendicular to the first direction. The gantry beam is typically supported at both ends by a pair of carriages. If movement in three dimensions is required, the device is movably supported on the carriage so that the device is moveable in a third direction which is typically perpendicular to both the first and second directions. The three directions are typically orthogonal XYZ axes.

Typical conventional positioning systems include gantries of a T or H-shaped configuration. In these positioning systems, measurement in the XY plane is performed by mounting machine-readable position-encoded scales in line with each of the X and Y actuators. The layout is simple to implement and the servo control architecture is straightforward.

FIG. 1 shows a plan view of such a system, being a gantry system with an H-shaped configuration. One application is an Surface Mount Technology (SMT) placement machine. The gantry system controls the positioning of devices 18 over a working area 19, for example the substrate surface of a SMT device.

The devices 18 are mounted on an X actuator carriage 14. The carriage is movable in an X direction along an X gantry beam 13. The ends of the X gantry beam are mounted on respective Y actuator carriages 11, 12 to provide for movement of the X beam in a Y direction. Respective sensors in the Y actuator carriages 11, 12 are used to determine the Y position of the X beam 13 and the X carriage 14 from respective machine-readable position-encoded scales 15, 16. A sensor in the X carriage 14 is used to determine the X position of the X carriage from a machine-readable position-encoded scale 17 which is fixed to the X gantry 13.

The disadvantage of such a system is the lack of information on parasitic errors which degrade the final overall positioning accuracy. Such errors occur in both axes and can include tilts and deviations from straightness. While parasitic errors can be compensated for to a certain extent, for example by an indirect calibration process such as volumetric mapping, the errors tend to change with time, for example due to long-term dimensional instability or thermal deformations in the gantry system or its components. The frequency of re-calibration has to be determined from the level of accuracy required, as well as from the stability of the environmental conditions. Even if re-calibration is performed periodically, non-correctable errors, for example random, non-repeatable errors in the mechanical system, will remain. These errors pose limits to the final level of positioning accuracy achievable with the system described above with reference to FIG. 1.

It is technically possible to freeze a two dimensional measurement grid with an absolute accuracy of micrometer level over an area of some 400 mm×400 mm. If desired, further improvements could be made by error mapping to achieve nanometer accuracies. Such a two dimensional grid can be made almost totally temperature independent by using zero expansion glass substrates. Examples of suitable materials include Zerodur or ultra low thermal expansion material (ULE), with a coefficient of thermal expansion (CTE) of 0±0.02 ppm.

Such a grid of an appropriate size can be employed at the mean working level for absolute error mapping of the gantry system. The process is fast and direct, and enables repeated measurement for improved accuracy within a reasonable timeframe in which thermal change has negligible effect on the dimensional stability of the mechatronic system.

FIG. 2 shows an end elevation of the gantry system of FIG. 1 with the addition of an appropriately sized grid 21 placed directly above the gantry system. The grid is placed with sufficient flatness and parallelism to the working area 19. A look-up sensor head 22 reads the instantaneous X and Y positions of the gantry. However, this reading if the XY position is made at the level of the grid 21 which is displaced in a vertical direction above the working area. As such, Abbe errors due to pitch and roll of the gantry beam and X carriage have to be kept to within reasonable levels, or compensated for.

The Abbe errors can be compensated for by making real-time pitch and roll measurements of the gantry relative to a flat reference surface which, conveniently, can be the grid 21 already provided for making XY measurements. With such a metrology system, no calibration is required and dimensional changes due to thermal effects can be readily measured and corrected, at least to some extent. In effect, the gantry no longer relies on the quality of its guiding system but rather on those of the measurement system. However, this system still suffers from the disadvantage of poor visibility of, and accessibility to, the working area 19 which is covered by the 'overhead' two dimensional grid 21.

SUMMARY OF INVENTION

It is an object of the present invention to provide a method and apparatus which determines the relative position of a movable device with respect to an environment in which the device is moved, or at least to determine a position while reducing the effects of some of the problems of the prior art noted above.

In one aspect the invention may be broadly said to be a position measurement system for determining the position of a working point relative to a working space, the position measurement system including at least first and second measurement modules, the first measurement module being capable of providing measurements of a first set of displacements of the working point relative to an intermediate component, the first set of measured displacements including a relatively large displacement in a first linear degree of freedom and relatively small displacements in at least two of the five degrees of freedom other than the first, the second measurement module being capable of providing measurements of a second set of displacements of the intermediate component relative to the working space, the second set of measured displacements including a relatively large displacement in a second linear degree of freedom, the second degree of freedom being different from the first, the second set of measured displacements also including relatively small displacements in at least two of the five degrees of freedom other than the second.

Preferably, the position measurement system includes a further measurement device capable of providing a further measurement of the displacement of the intermediate component relative to the working space in the second degree of freedom, but at a location offset perpendicularly to that degree of freedom from the location of the measurement made by the second module.

Preferably, the further measurement includes redundant displacement information which is used for self-calibration of the position measurement system.

Optionally, the working space is a three dimensional volume, the first set of displacements is of the working point relative to a first part of the intermediate component, the second set of displacements is of a second part of the intermediate component relative to the working space, and the position measurement system includes at least a third measurement module, the third measurement module being capable of providing measurements of a third set of displacements of the first part of the intermediate component relative to the second part of the intermediate component, the third set of measured displacements including a relatively large displacement in a third linear degree of freedom, the third degree of freedom being different from the first and second, the third set of measured displacements also including relatively small displacements in at least two of the five degrees of freedom other than the third.

Preferably, each measurement module consists of a plurality of optically encoded scales and a plurality of optical reading heads, the scales and heads of each module providing the measurements of the displacements as measurements of incremental displacements in orthogonal directions.

Preferably, the optically encoded scales are pre-calibrated to an absolute orthogonal grid.

Preferably, the optically encoded scales are manufactured on a substrate having a substantially zero coefficient of thermal expansion.

Alternatively, the optically encoded scales are manufactured on a substrate having a high thermal conductivity.

Preferably, the optically encoded scales are optical gratings.

Preferably, each measurement module includes an optically encoded grating which extends longitudinally in one direction on a substrate having a side which is substantially planar in the longitudinal direction, the planar side being substantially perpendicular to the plane of the grating, the module also including at least one optical reading head capable of measuring displacements in the longitudinal direction of the grating and at least one non-contact sensor capable of measuring displacements relative to the plane of the planar side.

Preferably, the non-contact sensor is a capacitive, inductive or optical sensor.

Preferably, a first part of the first measurement module is kinematically fixed relative to the working point, and a second part of the first measurement module is kinematically fixed relative to at least a part of the intermediate component.

Preferably, a first part of the second measurement module is kinematically fixed relative to the intermediate component, and a second part of the second measurement module is kinematically fixed relative to the working space.

In a second aspect the invention may be broadly said to be a multiple axis positioning device including the position measurement system of the first aspect of the invention, with or without the preferences, options and alternatives noted above, and including at least first and second motion actuators connected in a kinematically sequential chain and operable to position the working point in the working space, the first actuator moving the working point relative to the intermediate component and the second actuator moving the intermediate component relative to the working space.

Preferably, the positioning device is a gantry table having a carriage supported by a gantry beam, the carriage carrying the working point, the gantry beam being the intermediate component, the first actuator being operable to move the carriage and the working point relative to the gantry beam and the second actuator being operable to move gantry beam relative to the working space to position the working point in the working space, and the movement of the gantry beam being not parallel to the movement of the carriage and working point relative to the gantry beam.

Preferably, the gantry table is an XY positioning table having an H-shaped configuration, the carriage moves along the gantry beam in an X axis direction, the beam is supported at each end for movement over the table along two substantially parallel Y axis tracks, and the X and Y axes are substantially perpendicular.

Alternatively, the gantry table is an XY positioning table having a T-shaped configuration, the carriage moves along the gantry beam in an X axis direction, the beam is supported at one end for movement over the table along a Y axis track, and the X and Y axes are substantially perpendicular.

In a third aspect the invention may be broadly said to be a method of determining the position of a working point relative to a working space, including measuring a first set of displacements of the working point relative to an intermediate component, the first set of measured displacements including a relatively large displacement in a first linear degree of freedom and relatively small displacements in at least two of the five degrees of freedom other than the first, measuring a second set of displacements of the intermediate component relative to the working space, the second set of measured displacements including a relatively large displacement in a second linear degree of freedom, the second degree of freedom being different from the first, the second set of measured displacements also including relatively small displacements in at least two of the five degrees of freedom other than the second, and determining the position of the working point relative to the working space from the displacements of the first and second sets.

Preferably, the working space is a three dimensional volume, the first set of displacements is of the working point relative to a first part of the intermediate component, the second set of displacements is of a second part of the intermediate component relative to the working space, the method including measuring a third set of displacements of the first part of the intermediate component relative to the second part of the intermediate component, the third set of measured displacements including a relatively large displacement in a third linear degree of freedom, the third degree of freedom being different from the first and second, the third set of measured displacements also including relatively small displacements in at least two of the five degrees of freedom other than the third.

Preferably, the displacements are measured in orthogonal directions using optically encoded scales and optical reading heads.

Preferably, the optically encoded scales are manufactured on substrates having a substantially zero coefficient of thermal expansion.

Alternatively, the optically encoded scales are manufactured on substrates having a high thermal conductivity.

Preferably, the optically encoded scales are optical gratings.

In a fourth aspect the invention may be broadly said to be a method of positioning a working point in a working space, including the method of determining the position of a working point, of the third aspect of the invention, and including moving the working point by least first and second motion actuators connected in a kinematically sequential chain, the first actuator moving the working point relative to the intermediate component and the second actuator moving the intermediate component relative to the working space.

Preferably, the method includes using a gantry table having a carriage supported by a gantry beam, the carriage carrying the working point, and the gantry beam being the intermediate component, and operating the first actuator to move the carriage and the working point relative to the gantry beam and operating the second actuator to move the gantry beam relative to the working space to position the working point in the working space.

Preferably, the gantry table has an H-shaped configuration and the beam is supported at each end for movement over the table, including moving the carriage along the gantry beam in an X axis direction, and moving the gantry beam along two substantially parallel Y axis tracks, the X and Y axes being substantially perpendicular.

Alternatively, the gantry table has an T-shaped configuration and the beam is supported at one end for movement over the table, including moving the carriage along the gantry beam in an X axis direction, and moving the gantry beam along a Y axis track, the X and Y axes being substantially perpendicular.

The invention may further be said to consist in any alternative combination of parts or features mentioned herein or shown in the accompanying drawings. Known equivalents of these parts or features which are not expressly set out are nevertheless deemed to be included.

BRIEF DESCRIPTION OF DRAWINGS

Preferred modes and embodiments of the invention will now be described with reference to the accompanying drawings of which.

DETAILED DESCRIPTION OF THE PREFERRED EMBODIMENTS

It is to be appreciated that positioning systems according to the current invention may be implemented in various forms. The following embodiments are described by way of example only.

Figure 1:
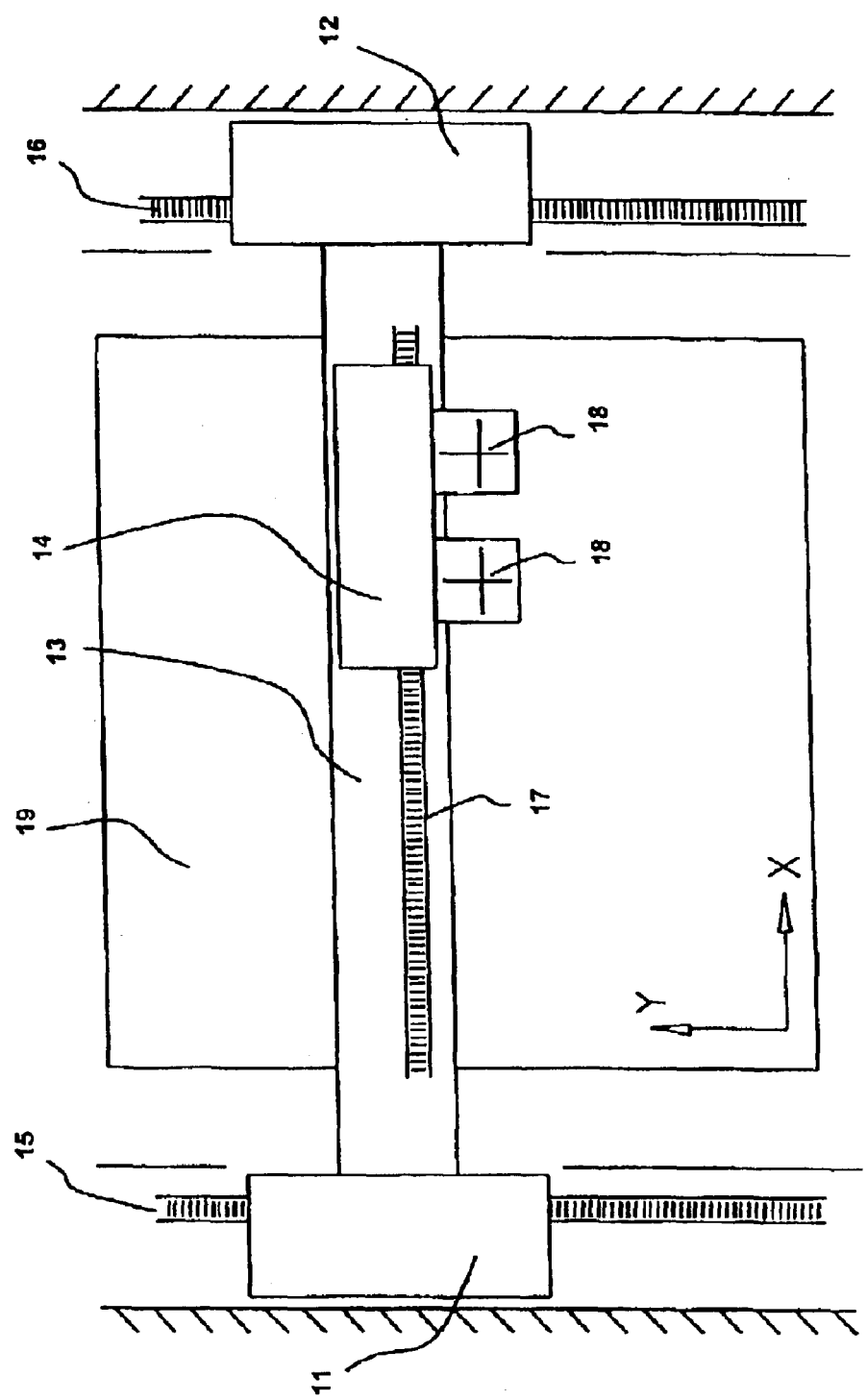
FIG. 1 shows a schematic plan view of a prior art positioning device.
Figure 2:
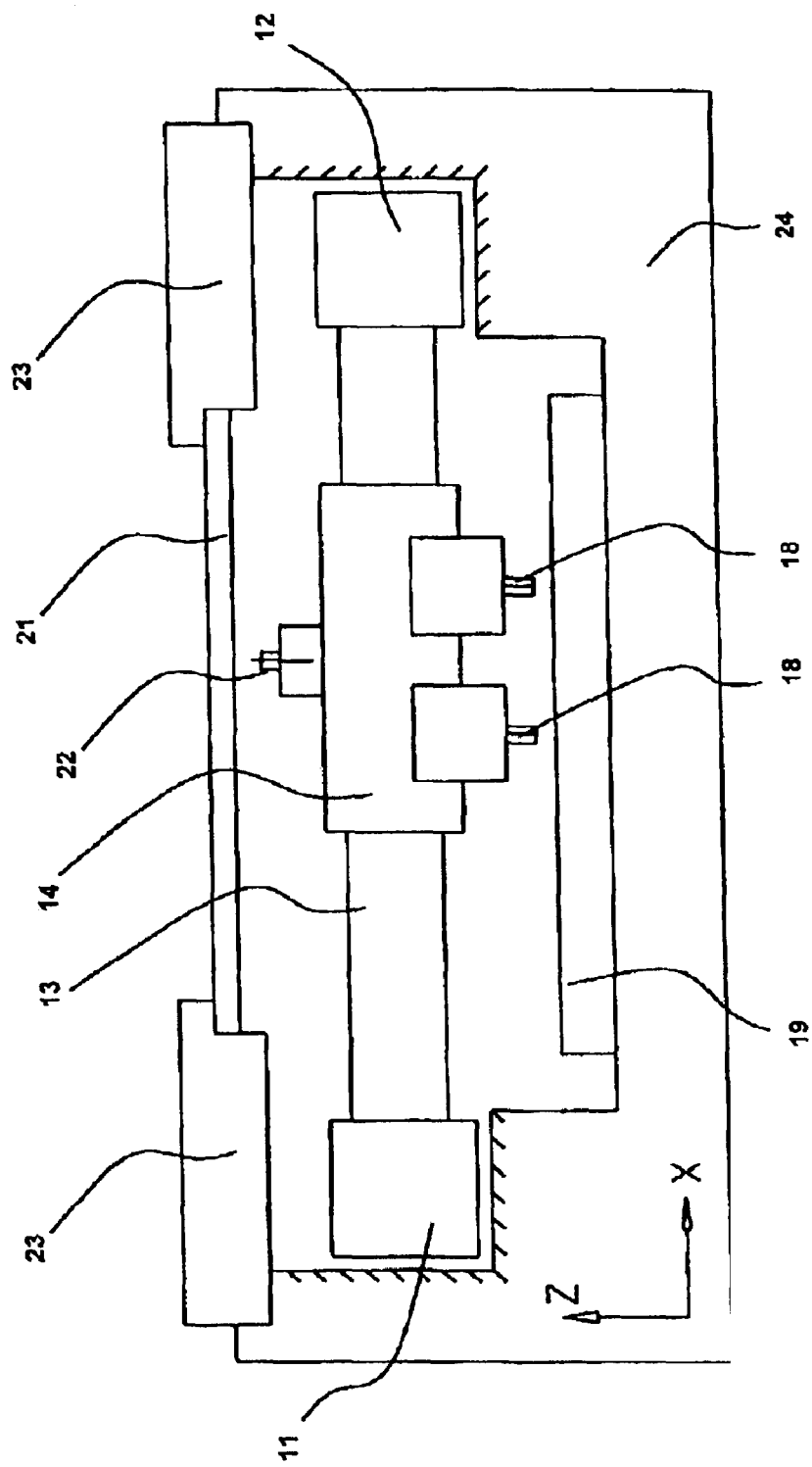
FIG. 2 is a schematic front elevation of a prior art positioning device, being the positioning device of FIG. 1 with the addition of a two dimensional grid above the working area.
Figure 3:
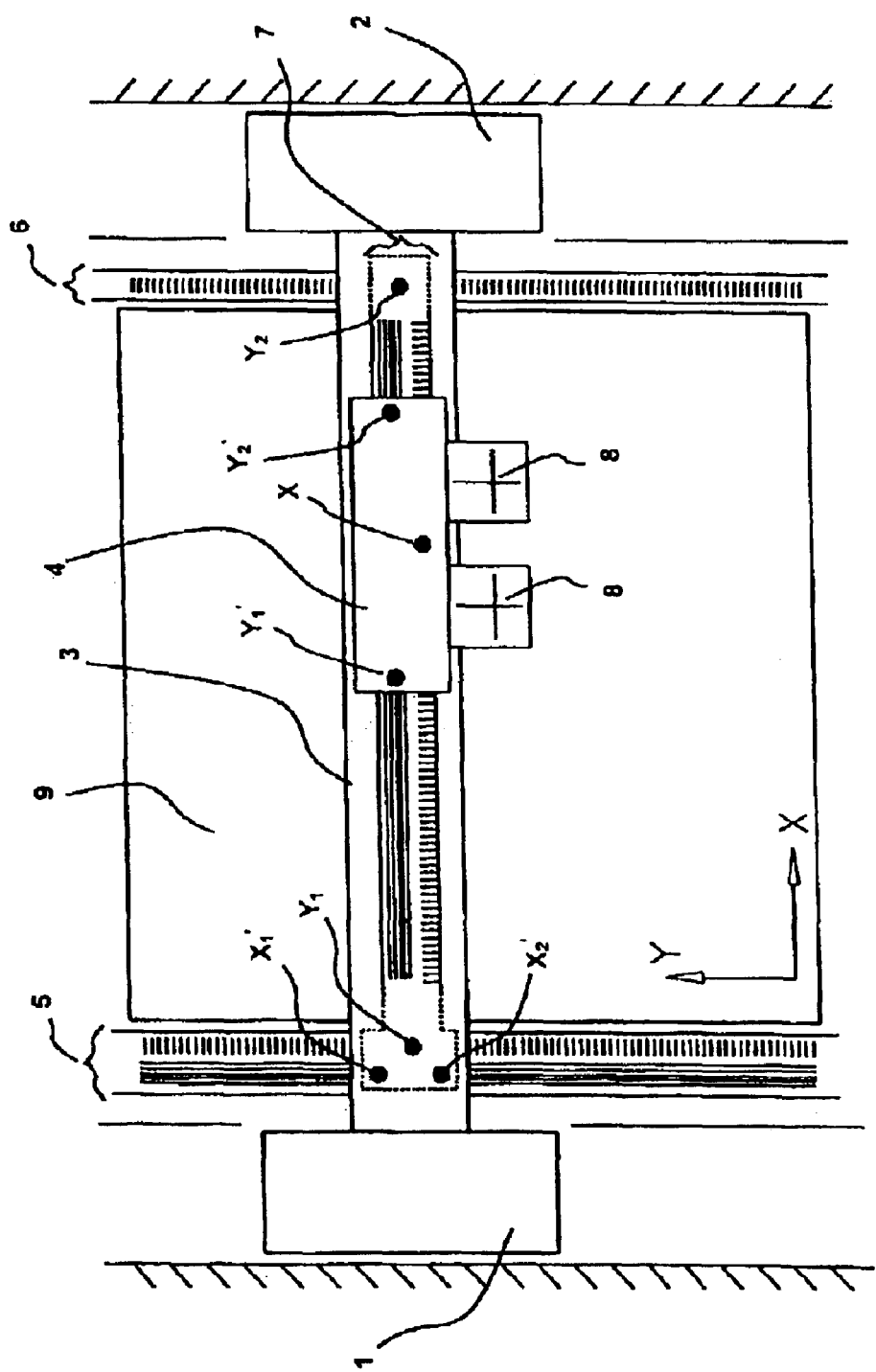
FIG. 3 shows a schematic plan view of a preferred positioning device according to the current invention.

FIG. 3 shows a schematic plan view of a preferred positioning device according to the current invention. The positioning device has a gantry system with an H-shaped configuration. The gantry system controls the position of devices 8 over a working area 9.

The devices 8 are mounted on an X actuator carriage 4. The X carriage is movable in an X direction along an X gantry beam 3. The gantry beam is supported at its ends, for movement in the Y direction, on two Y actuator carriages 1, 2 which move along tracks along respective opposite sides of the working area 9. Sensors $Y_1$ and $Y_2$ in the Y carriages 1, 2 are used to determine the Y position of the X carriage 4 from position-encoded machine-readable scales 5 and 6. A sensor X in the X carriage 4 is used to determine the X position of the X carriage from a position-encoded machine-readable scale 7 which is fixed to the X gantry beam 3.

The $Y_1$ and $Y_2$ scales 5, 6 are each linearly encoded, for example with an optical grating, and are mounted on respective sides of the working area 9. These two scales are mounted so that they remain substantially parallel in the Y direction under all working conditions and are fixed rigidly at one point each, relative to the substrate holder 9, along the Y direction. The orthogonal stability of these two fixation points, relative to the $Y_1$ scale 5 itself, also has to be maintained. The vertical position (i.e. perpendicular to both X and Y) of the optical gratings on the $Y_1$ and $Y_2$ scales should be as close as possible to the mean working level, for example, the top surface of the substrate being worked on.

The effects of machine structure stability on the final positioning accuracy, and particularly the stability between the work-piece holders and the gantry structure, can be largely eliminated by mounting the measurement system close to the vicinity of the working area, rather than on the gantry structure itself. This is necessary since the work-piece is the real point of interest.

As shown in FIG. 3, the $Y_1$ scale 5 (on left side in FIG. 3) is a compound scale having one strip encoded with a first grating for determinations of displacement in the Y direction, and a second strip encoded with a second grating being aligned perpendicularly to the first, for determination of displacement in the X direction. The compound head enables:

(a) measurement of a $Y_1$ position using sensor head $Y_1$, (b) the X deviation of the beam 3 of the X gantry, using measurements from sensors $X_1'$ and/or $X_2'$, and (c) ideally also the yaw deviation θz, using measurements from sensors $X_1'$ and $X_2'$.

The $Y_2$ scale 6 (on right side in FIG. 3) is only needed to provide a Y direction measurement from sensor $Y_2$.

The $Y_1$ measurement point on scale 5 is used as the reference point, i.e. the XY origin, of the co-ordinate system as described, as well as for θz rotation, i.e. yaw, about the Z-axis.

The position sensors, or measurement reading heads, $Y_1$ and $Y_2$ of both Y scales are mounted on the X gantry beam 3. These measurement heads only need to be held stable relative to the X scale 7, especially in the measurement directions which are X, Y and θz for the $Y_1$ measurement and Y for the $Y_2$ measurement.

A compound reading head with measurement sensors $X_1'$, $X_2'$ and $Y_1$, is included at the left end of the X gantry beam 3. This compound head scans the compound scale 5 and provides three respective measurement outputs $X_1'$, $X_2'$ and $Y_1$. The compound scale has two encoded grating strips, in a manner similar to the compound scale 5 described above. The two sensors $X_1'$ and $X_2'$, are placed as far apart as possible. The two measurements $X_1'$ and $X_2'$, are required to measure the yaw deviation, $\theta z$. Zero yaw position can be defined absolutely if the X position measurement could be made absolute rather than incremental. Otherwise an indirect calibration for orthogonality can be carried out.

Scale 6 gives, in principle, a redundant measurement $Y_2$, but is incorporated as it can provide better resolution for yaw deviation than the two sensors $X_1'$ and $X_2'$, since the measurement sensors $Y_1$ and $Y_2$ are spaced further apart than are sensors $X_1'$ and $X_2'$. Redundant information from the $Y_2$ sensor can be used to for a self-calibration of the position measurement system.

However, the redundant sensor can be omitted, for example to save costs, or in a gantry having a T-shaped configuration. In the case of an H-shaped configuration gantry, position information referred to the centreline of each of the two Y actuators 1, 2, for example for commutation of linear actuator motors, can be calculated by extrapolation from $Y_1$ and $Y_2$. In practice the extrapolation error incurred will be negligibly small for the given context because the working yaw angle will be small.

A similar compound scale 7 is mounted onto the X gantry beam 3. This scale is mounted as close as possible to the position of interest at the end-effector points of the devices 8, for example the die collet in a die bonding machines, and to the vertical level of the substrate or other working surface 9. Mounting stability of the scale 7 relative to the beam of the X gantry beam 3 is not as important as the mounting stability relative to the measurement reading heads $Y_1$, $Y_2$, through which references to the Y scales are made. The dimensional stability in the XY plane between the working point, such as a placement head device 8, and the measurement sensors mounted on the X carriage 4, and which provide measurement outputs X, $Y_1'$ and $Y_2'$, is also of great importance.

As will be readily appreciated by one skilled in the art of quantifying movements and positions in a Cartesian co-ordinate system, the accuracy of basic XY measurements, for example obtained from the X and $Y_1$ sensors, may be improved by correcting these basic measurements with residual measurements, for example the measurements of the relatively small deviations obtained from the $X_1'$, $X_2'$, $Y_1'$, $Y_2'$, and $Y_2$ sensors. Although relatively small when compared to the basic measurements, these deviations can be significant when a position determination at a high level of accuracy is required. Such deviations can arise from linear displacements x, y, z, and roll ($\theta_x$), pitch ($\theta_y$) and yaw ($\theta_z$) in the operation of the gantry carriage assemblies and will be familiar as the six degrees of freedom in a Cartesian co-ordinate system.

Figure 4:
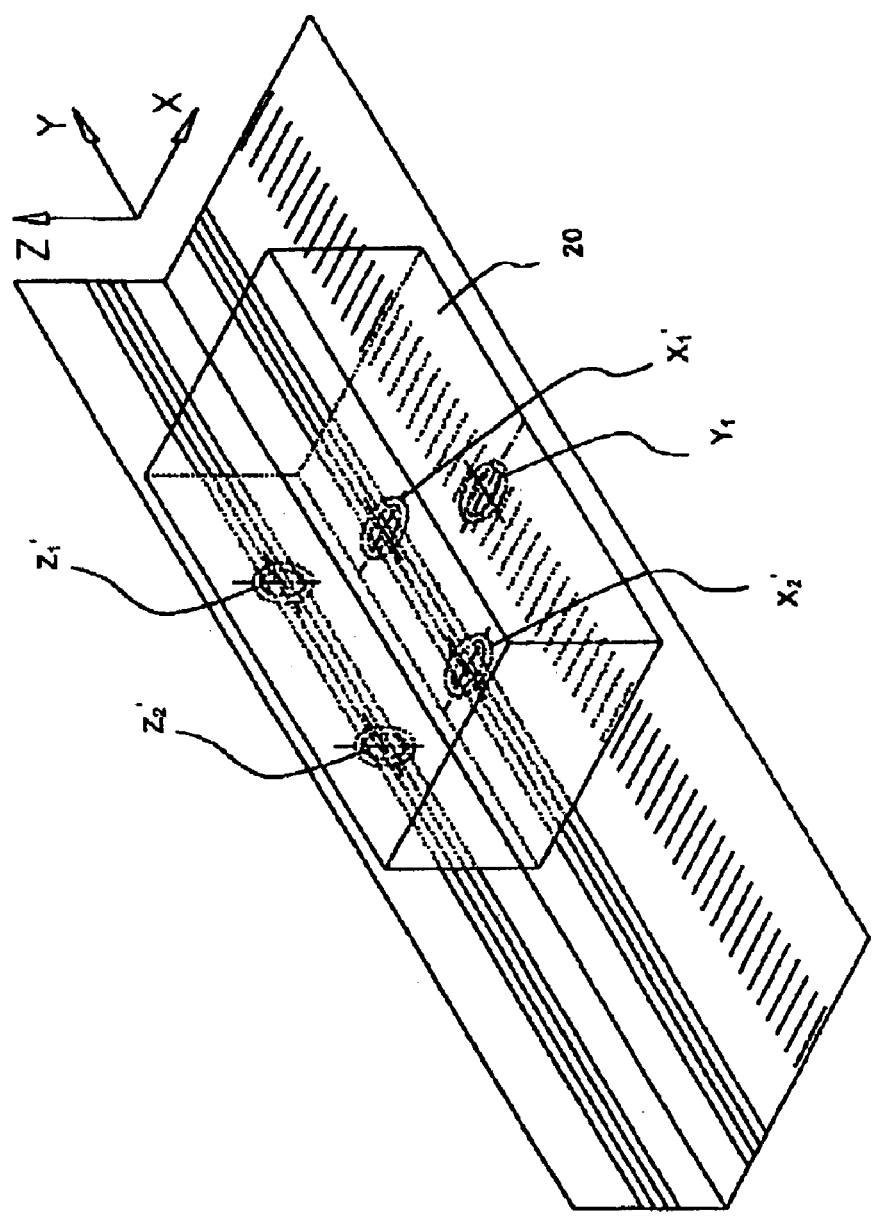
FIG. 4 shows an isometric view of a general embodiment of a compound sensor head of a positioning system according to the current invention.

FIG. 4 shows an isometric view of a general embodiment of a compound sensor head as an example of an extension of the concept of the compound sensor-head/scale as described above in relation to the carriage 1 of FIG. 3, to also measure pitch deviation. For instance, the compound sensor-head/scale shown in FIG. 4 can measure travel distance in the Y direction using the output of sensor $Y_1$ and can also track yaw and pitch deviations along the Y axis using the differential deviations of outputs from measurement pairs $X_1'$, $X_2'$ and $Z_1'$, $Z_2'$ respectively. Further, the mean of the absolute deviations in $X_1'$, $X_2'$ gives the deviation from straightness, while the mean of the absolute deviations in $Z_1'$, $Z_2'$ gives the deviation from flatness of the Y axis. A similar compound head/scale, having five sensors, can also be used to provide corresponding measurements for the X-axis.

The measurement system described is made substantially thermally insensitive, thus providing long-term dimensional stability, by making the scales of Zerodur or Ultra Low Expansion (ULE) glass. In cost-sensitive applications, in which the cost of Zerodur may not be acceptable, the position encoding scales could be produced on substrates with a high thermal conductivity as well as dimensional stability (e.g. stabilised aluminium or SiSiC). The high thermal conductivity helps to ensure that the temperature of the scales remains substantially uniform along the scale length and thus only creates a first order scaling error that can easily be compensated for, for example by three point calibration of the substrate fiducial marks.

The above-mentioned system is in essence an absolute grid and requires no calibration in service, other than an optional one-off mapping against an absolute standard to further enhance accuracy.

It is to be understood that the scales do not necessarily have to be based on optical gratings in both directions. For example, in one embodiment a single grating is exposed on a Zerodur or SiSiC substrate, one edge or side of which is finished to the required straightness or flatness, so that it may be used as a target reference surface for analogue proximity sensors, for example capacitive, inductive or optical sensors.

In one preferred arrangement the substrate has a planar side which is perpendicular to the plane of the grating. An optical reading head measures displacements along the longitudinal grating and at least one non-contact sensor (for example, a capacitive, inductive or optical sensor) measures displacements relative to the plane of planar side.

Although the above description refers to a positioning device with a largely flat working plane, i.e. a two dimensional working space, it is entirely feasible to apply the same measurement concept to a position device with a three dimensional working volume, for example as in a co-ordinate measurement machine. In such a case, multiple measurement modules capable of measuring displacements in up to all 6 degrees of freedom are required for each of the X, Y and Z axes of the machine. This is because, with relatively large working strokes, the residual errors in any degree of freedom of each axis can no longer be ignored.

It is also contemplated that the measurement system could also be applied to a linear positioning device, i.e. a device positioning a working point in a one dimensional space.

It will therefore be seen from the above description that the measurement system described The foregoing describes the invention including preferred forms thereof. Alterations and modifications as will be obvious to those skilled in the art are intended to be incorporated within the scope hereof as defined in the accompanying claims.

What is claimed is:

1. A position measurement system for determining the position of a working point (8) relative to a working space (9), the position measurement system including at least first and second measurement modules, the first measurement module being capable of providing measurements of a first set of displacements of the working point relative to an intermediate component (3), the first set of measured displacements including a relatively large displacement (X) in a first linear degree of freedom and relatively small displacements ($Y_1'$, $Y_2'$) in at least two of the five degrees of freedom other than the first, the second measurement module being capable of providing measurements of a second set of displacements of the intermediate component relative to the working space, the second set of measured displacements including a relatively large displacement ($Y_1$) in a second linear degree of freedom, the second degree of freedom being different from the first, the second set of measured displacements also including relatively small displacements ($X_1$, $X_2$) in at least two of the five degrees of freedom other than the second.

2. A position measurement system as claimed in claim 1, including a further measurement device capable of providing a further measurement of the displacement ($Y_2$) of the intermediate component relative to the working space in the second degree of freedom, but at a location offset perpendicularly to that degree of freedom from the location of the measurement made by the second module.

3. A position measurement system as claimed in claim 2, wherein the further measurement includes redundant displacement information which is used for self-calibration of the position measurement system.

4. A position measurement system as claimed in claim 1, wherein the working space is a three dimensional volume, the first set of displacements is of the working point relative to a first part of the intermediate component, the second set of displacements is of a second part of the intermediate component relative to the working space, and the position measurement system includes at least a third measurement module, the third measurement module being capable of providing measurements of a third set of displacements of the first part of the intermediate component relative to the second part of the intermediate component, the third set of measured displacements including a relatively large displacement in a third linear degree of freedom, the third degree of freedom being different from the first and second, the third set of measured displacements also including relatively small displacements in at least two of the five degrees of freedom other than the third.

5. A position measurement system as claimed in claim 1, wherein each measurement module consists of a plurality of optically encoded scales and a plurality of optical reading heads, the scales and heads of each module providing the measurements of the displacements as measurements of incremental displacements in orthogonal directions.

6. A position measurement system as claimed in claim 5, wherein the optically encoded scales are pre-calibrated to an absolute orthogonal grid.

7. A position measurement system as claimed in claim 5, wherein the optically encoded scales are manufactured on a substrate having a substantially zero coefficient of thermal expansion.

8. A position measurement system as claimed in claim 5, wherein the optically encoded scales are manufactured on a substrate having a high thermal conductivity.

9. A position measurement system as claimed in claim 5, wherein the optically encoded scales are optical gratings.

10. A position measurement system as claimed in claim 1, wherein each measurement module includes an optically encoded grating which extends longitudinally in one direction on a substrate having a side which is substantially planar in the longitudinal direction, the planar side being substantially perpendicular to the plane of the grating, the module also including at least one optical reading head capable of measuring displacements in the longitudinal direction of the grating and at least one non-contact sensor capable of measuring displacements relative to the plane of the planar side.

11. A position measurement system as claimed in claim 10, wherein the non-contact sensor is a capacitive, inductive or optical sensor.

12. A position measurement system as claimed in claim 1, wherein a first part of the first measurement module is kinematically fixed relative to the working point, and a second part of the first measurement module is kinematically fixed relative to at least a part of the intermediate component.

13. A position measurement system as claimed in claim 1, wherein a first part of the second measurement module is kinematically fixed relative to the intermediate component, and a second part of the second measurement module is kinematically fixed relative to the working space.

14. A multiple axis positioning device including the position measurement system as claimed in claim 1, and including at least first and second motion actuators connected in a kinematically sequential chain, and operable to position the working point in the working space, the first actuator moving the working point relative to the intermediate component and the second actuator moving the intermediate component relative to the working space.

15. The multiple axis positioning device as claimed in claim 14, wherein the positioning device is a gantry table having a carriage supported by a gantry beam, the carriage carrying the working point, the gantry beam being the intermediate component, the first actuator being operable to move the carriage and the working point relative to the gantry beam and the second actuator being operable to move gantry beam relative to the working space to position the working point in the working space, and the movement of the gantry beam being not parallel to the movement of the carriage and working point relative to the gantry beam.

16. The multiple axis positioning device as claimed in claim 15, wherein the gantry table is an XY positioning table having an H-shaped configuration, the carriage moving along the gantry beam in an X axis direction and the beam being supported at each end for movement over the table along two substantially parallel Y axis tracks, the X and Y axes being substantially perpendicular.

17. The multiple axis positioning device as claimed in claim 15, wherein the gantry table is an XY positioning table having a T-shaped configuration, the carriage moving along the gantry beam in an X axis direction and the beam being supported at one end for movement over the table along a Y axis track, the X and Y axes being substantially perpendicular.

18. A method of determining the position of a working point relative to a working space, including measuring a first set of displacements of the working point relative to an intermediate component, the first set of measured displacements including a relatively large displacement in a first linear degree of freedom and relatively small displacements in at least two of the five degrees of freedom other than the first, measuring a second set of displacements of the intermediate component relative to the working space, the second set of measured displacements including a relatively large displacement in a second linear degree of freedom, the second degree of freedom being different from the first, the second set of measured displacements also including relatively small displacements in at least two of the five degrees of freedom other than the second, and determining the position of the working point relative to the working space from the displacements of the first and second sets.

19. A method of determining the position of a working point as claimed in claim 18, wherein the working space is a three dimensional volume, the first set of displacements is of the working point relative to a first part of the intermediate component, the second set of displacements is of a second part of the intermediate component relative to the working space, the method including measuring a third set of displacements of the first part of the intermediate component relative to the second part of the intermediate component, the third set of measured displacements including a relatively large displacement in a third linear degree of freedom, the third degree of freedom being different from the first and second, the third set of measured displacements also including relatively small displacements in at least two of the five degrees of freedom other than the third.

20. A method of determining the position of a working point as claimed in claim 18, wherein the displacements are measured in orthogonal directions using optically encoded scales and optical reading heads.

21. A method of determining the position of a working point as claimed in claim 20, wherein the optically encoded scales are manufactured on substrates having a substantially zero coefficient of thermal expansion.

22. A method of determining the position of a working point as claimed in claim 20, wherein the optically encoded scales are manufactured on substrates having a high thermal conductivity.

23. A method of determining the position of a working point as claimed in claim 20, wherein the optically encoded scales are optical gratings.

24. A method of positioning a working point in a working space, including the method of determining the position of the working point as claimed in claim 18, and including moving the working point by least first and second motion actuators connected in a kinematically sequential chain, the first actuator moving the working point relative to the intermediate component and the second actuator moving the intermediate component relative to the working space.

25. A method of positioning a working point in a working space as claimed in claim 24, including using a gantry table having a carriage supported by a gantry beam, the carriage carrying the working point, and the gantry beam being the intermediate component, and operating the first actuator to move the carriage and the working point relative to the gantry beam and operating the second actuator to move the gantry beam relative to the working space to position the working point in the working space.

26. A method of positioning a working point in a working space as claimed in claim 25, wherein the gantry table has an H-shaped configuration and the beam is supported at each end for movement over the table, including moving the carriage along the gantry beam in an X axis direction, and moving the gantry beam along two substantially parallel Y axis tracks, the X and Y axes being substantially perpendicular.

27. A method of positioning a working point in a working space as claimed in claim 25, wherein the gantry table has an T-shaped configuration and the beam is supported at one end for movement over the table, including moving the carriage along the gantry beam in an X axis direction, and moving the gantry beam along a Y axis track, the X and Y axes being substantially perpendicular.

* * * * *